(12) United States Patent
Szlemko et al.

(10) Patent No.: US 10,054,400 B2
(45) Date of Patent: Aug. 21, 2018

(54) ROBOT ARM LAUNCHING SYSTEM

(71) Applicant: Raytheon Company, Waltham, MA (US)

(72) Inventors: Emile M. Szlemko, Vail, AZ (US); Huy Le, Tucson, AZ (US); Brian A. Gin, Tucson, AZ (US); Ryan P. Wahl, Tucson, AZ (US); Mary L. Kulbacki, Green Valley, AZ (US)

(73) Assignee: Raytheon Company, Waltham, MA (US)

( * ) Notice: Subject to any disclaimer, the term of this patent is extended or adjusted under 35 U.S.C. 154(b) by 169 days.

(21) Appl. No.: 15/264,934

(22) Filed: Sep. 14, 2016

(65) Prior Publication Data
US 2018/0073838 A1 Mar. 15, 2018

(51) Int. Cl.
*G05B 15/00* (2006.01)
*F41G 5/16* (2006.01)
(Continued)

(52) U.S. Cl.
CPC ............. *F41G 5/16* (2013.01); *B25J 9/161* (2013.01); *B25J 9/1694* (2013.01); *F41A 23/20* (2013.01); *F41A 27/30* (2013.01); *F41F 1/085* (2013.01); *F41G 5/22* (2013.01); *F41G 5/24* (2013.01); *B63G 1/00* (2013.01); *B63G 3/04* (2013.01)

(58) Field of Classification Search
CPC ..... F41G 5/16; F41G 5/22; F41G 5/24; F41A 23/20; F41A 27/30; F41F 1/085; B25J 9/161; B25J 9/1694; B63G 3/04; B63G 1/00
See application file for complete search history.

(56) References Cited

U.S. PATENT DOCUMENTS 3,757,635 A 9/1973 Nickerson et al.
4,949,026 A 8/1990 Mead
(Continued)

FOREIGN PATENT DOCUMENTS

DE 200 16 307 U1 3/2001
EP 0 378 157 A1 7/1990
(Continued)

OTHER PUBLICATIONS

International Search Report and Written Opinion for corresponding International Application No. PCT/US2017/023285 dated Dec. 22, 2017.

*Primary Examiner* — Ian Jen
(74) *Attorney, Agent, or Firm* — Renner, Otto, Boisselle & Sklar, LLP

(57) ABSTRACT

An effector launching system and method may be used on a moving ship deck. The launching system includes a plurality of effectors and a robot that is arranged on the moving platform. The robot includes a moveable robot arm having an end portion that is engageable with the effectors for firing the effectors during engagement. The system includes a sensor for detecting movement of the moving platform and a motion stabilization controller that is in communication with a processor and the robot arm for controlling movement of the robot arm. The motion stabilization controller adjusts the robot arm in response to the detected movement of the moving platform to maintain the end portion in a static position when the effector is fired.

20 Claims, 7 Drawing Sheets

(51) Int. Cl.

| | |
|---|---|
| *B25J 9/16* | (2006.01) |
| *F41G 5/24* | (2006.01) |
| *F41G 5/22* | (2006.01) |
| *F41A 27/30* | (2006.01) |
| *F41F 1/08* | (2006.01) |
| *F41A 23/20* | (2006.01) |
| *B63G 1/00* | (2006.01) |
| *B63G 3/04* | (2006.01) |

(56) References Cited

U.S. PATENT DOCUMENTS

| | | | |
|---|---|---|---|
| 5,737,500 | A | 4/1998 | Seraji et al. |
| 6,995,539 | B1 | 2/2006 | Challoner |
| 7,032,493 | B2 | 4/2006 | Fowler |
| 7,348,747 | B1 | 3/2008 | Theobold et al. |
| 7,410,125 | B2 | 8/2008 | Steele |
| 8,468,924 | B2 | 6/2013 | Skurdal et al. |
| 9,020,639 | B2 * | 4/2015 | Bewley .................... B25J 5/005 700/250 |
| 2015/0367509 | A1 * | 12/2015 | Georgeson ............ B64F 5/0045 700/258 |

FOREIGN PATENT DOCUMENTS

| | | |
|---|---|---|
| EP | 2 390 613 A1 | 11/2011 |
| WO | 2002/013276 A2 | 12/2002 |
| WO | 2015166487 A1 | 11/2015 |

* cited by examiner

ROBOT ARM LAUNCHING SYSTEM

FIELD OF THE INVENTION

The invention relates to a system for launching an effector and more particularly, an effector launching system for a moving vehicle, such as a land vehicle or a naval ship.

DESCRIPTION OF THE RELATED ART

Effector launching systems may be used in various defense applications. Land vehicles, marine vessels, and aircrafts are examples of defense applications that may use an effector launching system. Conventionally-used launching systems may be point systems in that the systems are specifically configured to perform a specific mission with a launching sequence that utilizes a known effector having a predetermined shape and size. An example of a known effector may be a certain type of missile having a predetermined shape, size, and speed. Accordingly, the point-system launchers are generally configured to utilize only one type of effector. The launchers may also have a limited launching capability based on the number of payload rounds that are preloaded into the launcher.

Thus the launchers may only be suitable for a land vehicle or ship of a predetermined size and may not be scalable for other applications, such that point-system launchers may not be configurable for use with upgraded effectors or different types of effectors. Consequently the use of point-system launchers may limit the variety and number of executable missions that may be performed by the launching system.

SUMMARY OF THE INVENTION

In contrast to conventional launching systems, the effector launching system of the present application may be modular by way of using a robot that is mounted to a moving platform, such as in a land vehicle or on a ship deck. The robot has a moveable robot arm that is engageable with different types of effectors, or payload guides that may contain different types of effectors. An effector may be fired from the robot arm upon engagement between the robot arm and the effector. The effector launching system also includes a motion stabilization controller that controls movement of the robot arm to accommodate for movement of the moving platform and the robot that is mounted to the moving platform. The system further includes a sensor for detecting movement of the moving platform, and the controller may adjust the robot arm in response to the detected movement. The controller moves the robot arm to maintain an end portion of the robot arm in a globally static position while firing the effector. Using the robot arm is advantageous in that the robot arm is operable with different types of effectors such that the launching system can execute a variety of different launching sequences that may use different effectors. Using a motion stabilization device is advantageous in that the system may implement the robot on a moving platform, i.e. the ship deck, as compared with conventionally-used robots that are only configured for use on stable platforms. The following aspects of the invention may be combinable in any combination.

According to an aspect of the invention, an effector launching system may be located on a moving platform. The effector launching system may include a plurality of effectors and a robot that includes a main body that is fixed to the moving platform. The robot may include a moveable robot arm having an end portion that is engageable with the plurality of effectors for firing the plurality of effectors. The effector launching system may further include a sensor for detecting movement of the moving platform, a processor that is in communication with the sensor, and a motion stabilization controller that is in communication with the processor and the robot arm for controlling movement of the robot arm. The motion stabilization controller may adjust the robot arm in response to the detected movement of the moving platform to maintain the end portion in a static position when the end portion is engaged with at least one of the plurality of effectors.

According to an aspect of the invention, the effector launching system may include a payload guide that houses the plurality of effectors, where the payload guide has an engaged position and a storage position. The payload guide may be engaged with the end portion of the robot arm when in the engaged position for firing the effector from the payload guide. The payload guide may be disengaged from the end portion when in the storage position.

According to an aspect of the invention, the payload guide may include an electro-mechanical interface that provides for communication between the robot and the plurality of effectors housed in the payload guide.

According to an aspect of the invention, the effector launching system may include a payload guide magazine that houses a plurality of payload guides. The payload guide magazine may be configured to automatically dispense one of the plurality of payload guides when another one of the plurality of payload guides is expended.

According to an aspect of the invention, the effector launching system may include a plurality of payload guide magazines, where each of the plurality of payload guide magazines houses a different type of effector or payload guide.

According to an aspect of the invention, the payload guide magazine may include an electro-mechanical interface that is in communication with the effectors for determining a number of effectors housed in the payload guide magazine.

According to an aspect of the invention, the sensor may be embedded in the robot arm.

According to an aspect of the invention, the sensor may include a gyroscope.

According to an aspect of the invention, the sensor may include an inertial measurement unit.

According to an aspect of the invention, the effector launching system may include a modular control system having a core processor module and a plurality of converting modules for executing a mission sequence. One of the plurality of converting modules may be connectable between the core processor module and the robot for converting data from the core processor module to readable data for the robot.

According to an aspect of the invention, a method of launching an effector from a moving platform may be provided. The moving platform may include a plurality of effectors and a robot having a main body fixed to the moving platform. The method may include using an end portion of a moveable robot arm to engage at least one of the plurality of effectors, detecting movement of the moving platform, adjusting the moveable robot arm to maintain the end portion of the moveable robot arm in a static position in response to the detected movement of the moving platform when the robot arm is engaged with the at least one of the plurality of effectors, and maintaining the end portion in the static position while firing the effector.

According to an aspect of the invention, the method may include storing the plurality of effectors in a payload guide and engaging the end portion of the moveable robot arm with the payload guide to fire the effectors from the payload guide during engagement.

According to an aspect of the invention, the method may include using a plurality of payload guides that each contain different types of effectors.

According to an aspect of the invention, the method may include automatically supplying one of the plurality of payload guides for engagement with the moveable robot arm after another one of the plurality of payload guides is expended.

According to an aspect of the invention, the method may include automatically dispensing the plurality of payload guides using a payload guide magazine that houses the plurality of payload guides.

According to an aspect of the invention, the method may include using the payload guide magazine to determine a number of effectors or payload guides contained in the payload guide magazine.

According to an aspect of the invention, the method may include using a sensor to detect movement of the moving platform.

According to an aspect of the invention, using the sensor may include using a gyroscope.

According to an aspect of the invention, using the sensor may include using an inertial measurement unit.

According to an aspect of the invention, adjusting the moveable robot arm may include using a controller to control movement of the moveable robot arm.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have application in defense applications, such as in a military land vehicle, marine vessel or any vehicle where space may be constrained. Examples of suitable marine vessels may include a ship, fast attack craft, patrol boat or other marine vehicle. Examples of other suitable vehicles may include ground based or air based vehicles such as cars, tanks, armored personnel carriers, hovercraft, helicopters, and planes. More specifically, the effector launching system described herein may be implemented in a land vehicle or a naval vessel having a moving platform effector launching system. The effector launching system includes a robot having a moveable robot arm for firing an effector. The system also includes a motion stabilization controller that adjusts the position of the robot arm in response to detected movement of the vehicle such that a firing end of the robot arm is maintained in a static position during the launching sequence. The effector launching system described herein may be a universal launching system suitable for any type of effector and any class of land vehicle or naval vessel.

Figure 1:
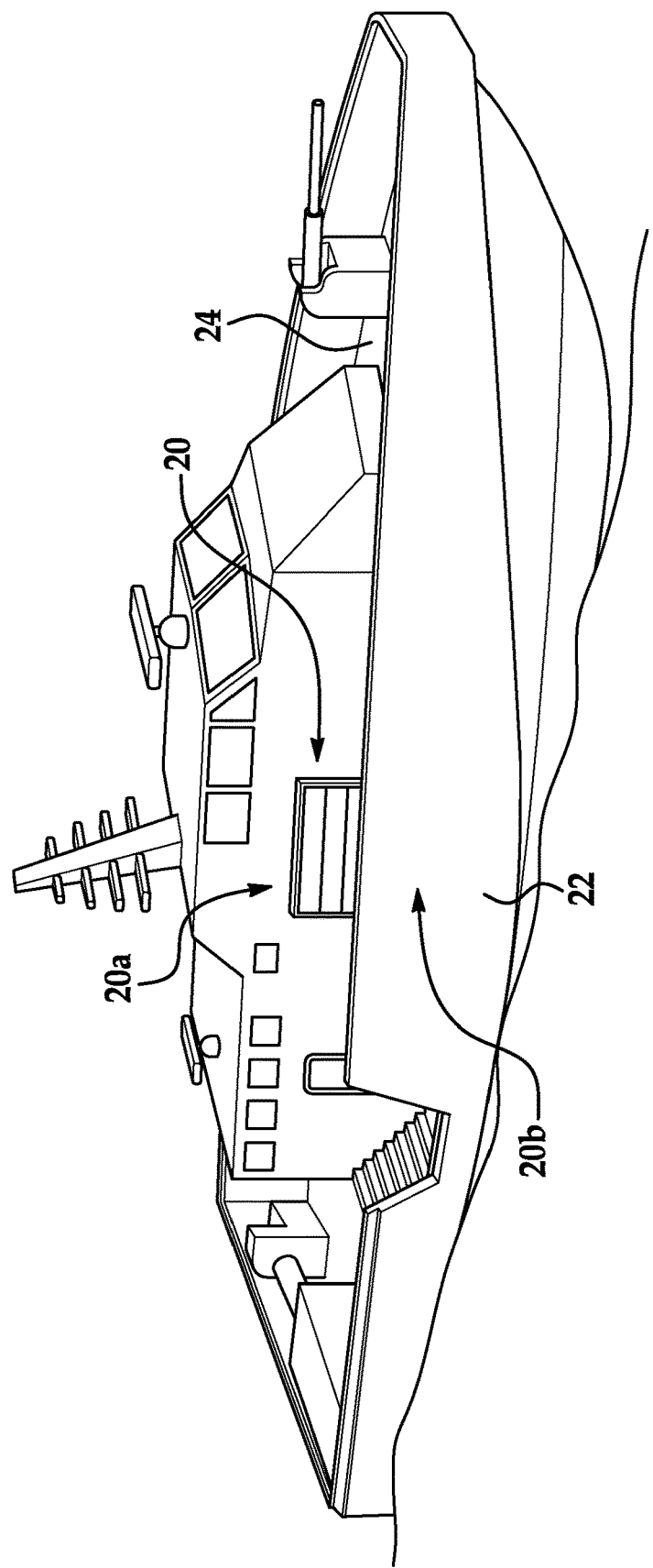
FIG. 1 is a schematic drawing of a vehicle having an effector launching system with a launching assembly and a modular control system.
Figure 2:
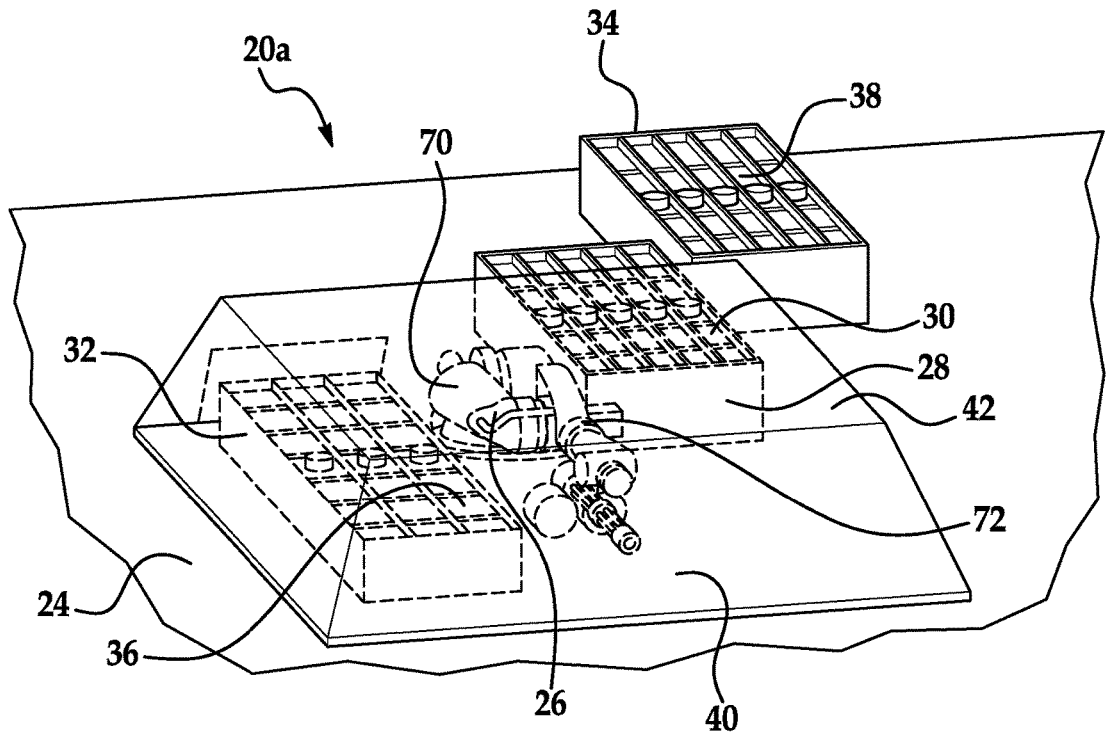
FIG. 2 is a schematic drawing showing the launching assembly in a stowed position.

Referring now to FIGS. 1 and 2, an effector launching system 20 may be configured for a vehicle 22, such as a land vehicle or naval vessel. The vehicle 22 may include a vehicle surface that is horizontal, vertical, or angled. The vehicle surface may be a moving platform 24 that moves with the vehicle, such as a horizontal ship deck or any moving surface in a land vehicle. The effector launching system 20 may include a launching assembly 20a that is arranged on the moving platform 24 such that the launching assembly 20a travels with the vehicle 22. In a naval vessel, the launching assembly 20a may be located above-deck, but the launching assembly 20a may be located below the ship deck in another configuration. For example, the launching assembly 20a may be located below the ship deck for launching a torpedo. In a land vehicle, the launching assembly 20a may be located on an external surface of the vehicle, but the launching assembly 20a may be located within an enclosed or internal compartment of the vehicle in another configuration. Details of the launching assembly 20a are schematically shown in FIG. 2. The launching assembly 20a may have a deployed position and a stowed position, the latter of which is shown in FIGS. 1 and 2.

The effector launching system 20 may also include a modular control system 20b for controlling the launching assembly 20a. The modular control system 20b may enable the launching assembly 20a to launch different types of effectors and accommodate for future effectors that may be suitable for use with the launching assembly 20a. Any suitable type of effector may be used and examples of suitable effectors include munitions or missiles, counter measure devices, unmanned aerial vehicles (UAVs), flares, and non-lethal effectors. Other types of effectors may also be suitable and the different effectors may be of the same type but have different specifications, such as size and shape. The control system 20b may be arranged below-deck or within an internal compartment of a land vehicle such that the control system 20b is located below the moving platform 24.

As shown in FIG. 2, the launching assembly 20a may include a robot 26 and a payload guide magazine 28 containing at least one canister 30 or a plurality of canisters that house effectors. The robot 26 may be an industrial robot, such as a robot system used for manufacturing. The robot 26 is generally automated, programmable, and capable of movement. The robot 26 and the payload guide magazine 28 may be arranged on the moving platform 24. The launching assembly 20a may include a plurality of payload guide magazines 28, 32, 34 that each house a plurality of canisters 30, 36, 38. Each payload guide magazine 28, 32, 34 may contain a different type of effector and all of the canisters associated with a particular payload guide magazine may house one type of effector. For example, the plurality of canisters that are associated with the payload guide magazine 28 may house a first type of effector, the plurality of canisters that are associated with the payload guide magazine 32 may house a second type of effector, and the plurality of canisters that are associated with the payload guide magazine 34 may house a third type of effector. In an exemplary configuration, each of the first, second, and third types of effector associated with the corresponding payload guide magazine may be a missile having a different size and/or shape. The variable selection of payload guide magazines and effectors is advantageous in that the launching assembly 20a may have a broader capability for a variety of executable launching sequences and missions.

The payload guide magazine 28 may provide automatic replenishment of effectors to the launching assembly 20a, such that the payload guide magazine 28 may provide a constant supply of canisters for launching. The payload guide magazines 28, 32, 34 may each include an electro-mechanical interface, such as an electro-mechanical case. The mechanical portion of the case may provide protection for the canisters 30, 36, 38 during storage of the canisters 30, 36, 38 and the electrical interface of the case may provide electrical communication between the effectors in the canisters 30, 36, 38 and the control system 20b. As shown in the stowed position of FIG. 2, at least one of the plurality of payload guide magazines 28, 32, 34 may be stowed within a housing 40 arranged on the moving platform 24. The housing 40 may include a cover 42 that may be closed prior to activation or operation of the launching system 20.

Figure 3:
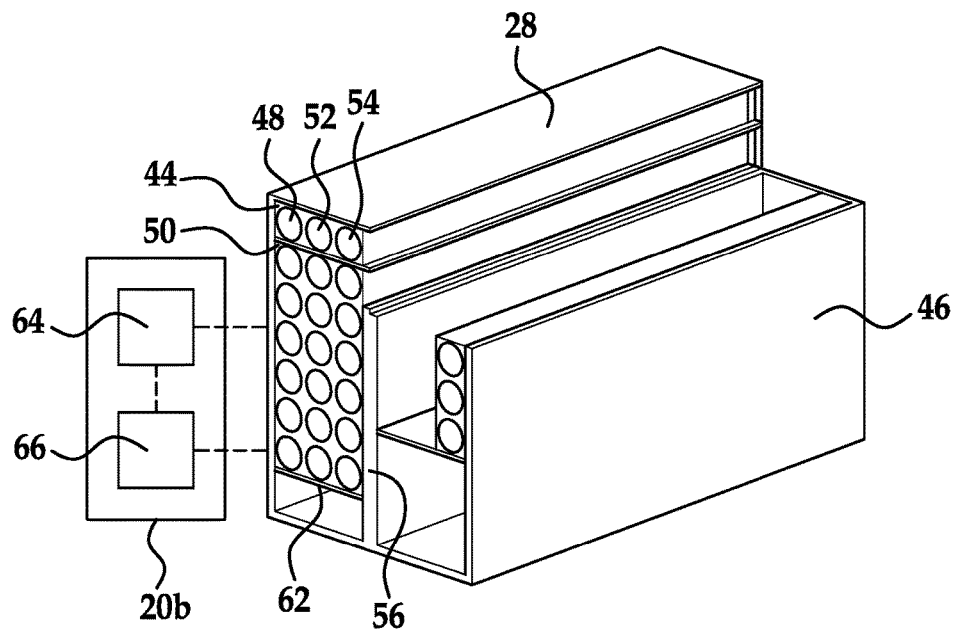
FIG. 3 is a schematic drawing showing a payload guide magazine of the launching assembly.

Referring in addition to FIG. 3, the payload guide magazine 28 may include at least one payload guide 44 or a plurality of payload guides contained within the electro-mechanical case 46 of the payload guide magazine 28. The aforementioned canisters may be configured as payload guides. Each payload guide 44 may include at least one effector 48. The effector 48 may have an elongated cylindrical shape and the payload guide 44 may have a complementary length to house and protect the effector 48 from the surrounding environment. During storage of the effector 48, the payload guide 44 may be configured to protect the effector 48 from temperature changes or other external environmental conditions, such that the effectors may be stored for a period of time before being deployed. The payload guide 44 may be generally rectangular in shape, but the payload guide 44 may have any suitable shape.

The payload guide magazine 28 may include a plurality of payload guides 44, 50 that each include a plurality of effectors 48, 52, 54. The payload guide 44 may include three effectors, 48, 52, 54. The payload guide 44 may include more or fewer than three effectors and the number of effectors may be dependent on the type of effector. The payload guides 44, 50 may be arranged horizontally or vertically within the electro-mechanical case 46. The electro-mechanical case 46 may include vertical walls 56 that separate pluralities of different payload guides. The pluralities of different payload guides may be separated based on the types of effectors housed in the payload guides. As shown in FIG. 3, the vertical wall 56 may separate a plurality of payload guides that are stacked vertically from a plurality of payload guides that are horizontally aligned. The payload guides may be arranged in rows or columns. The payload guides may be arranged in any suitable configuration within the payload guide magazine 28 and the arrangement may be dependent on the type of effector contained within the payload guides 44, 50.

Figure 4:
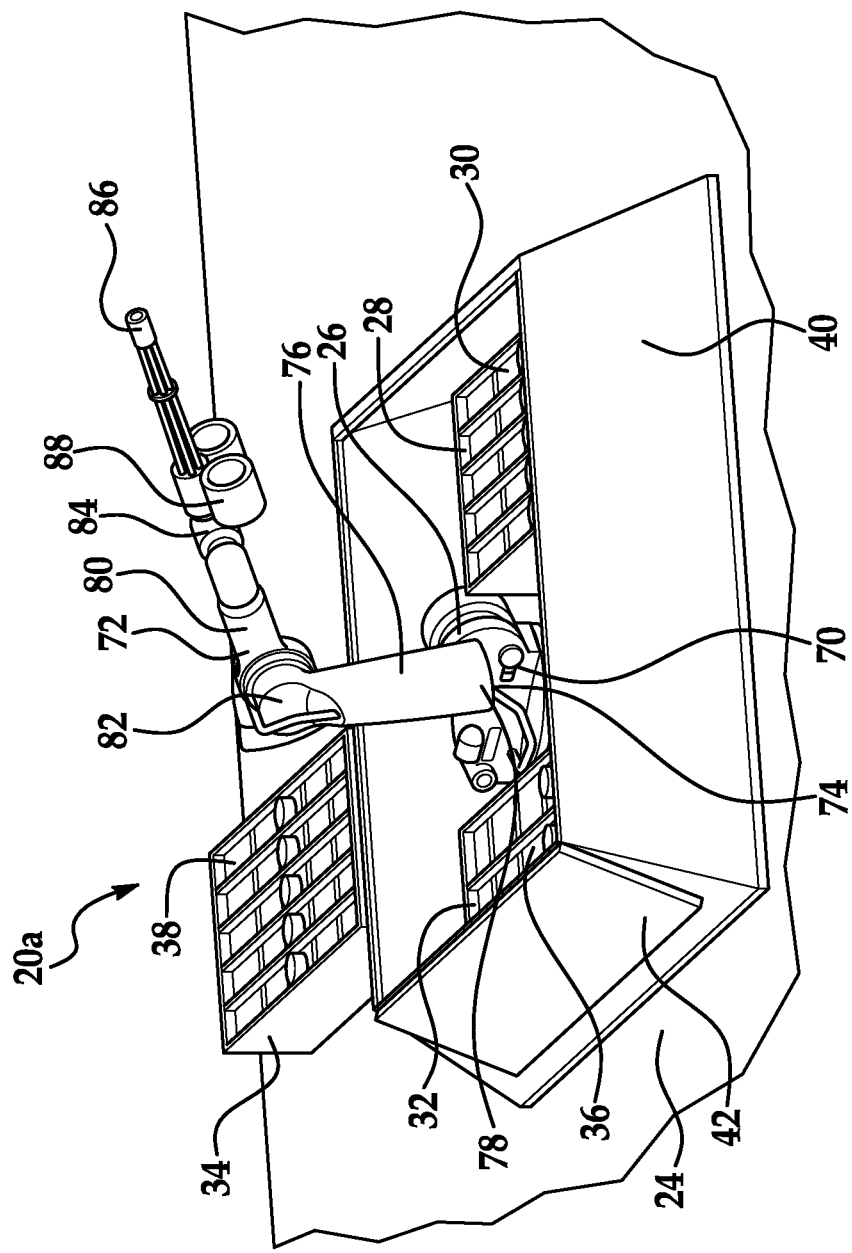
FIG. 4 is a schematic drawing showing the launching assembly during operation using a first type of effector.
Figure 5:
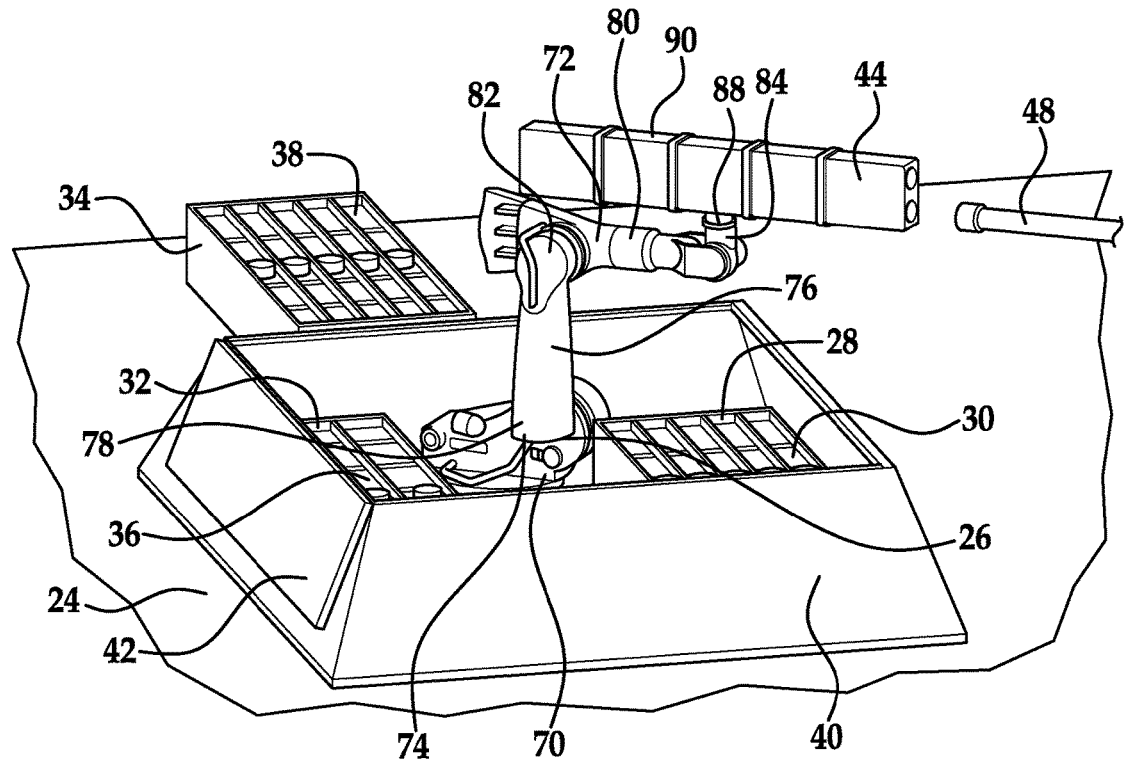
FIG. 5 is a schematic drawing showing the launching assembly during operation using a second type of effector.

Referring in addition to FIGS. 4 and 5, the robot 26 is schematically shown. A plurality of canisters may be provided and the canisters may be in the form of the payload guides 44, 50 containing the effectors 48, 52, 54. Dispensing the payload guides 44, 50 may include using the electro-mechanical case 46 of the payload guide magazine 28. The electro-mechanical case 46 may include a horizontal tray 62 that is vertically moveable within the payload guide magazine 28 to move the payload guides 44, 50 towards an upper end of the payload guide magazine 28. When the payload guide 44 is removed from the upper end of the electro-mechanical case 46, the horizontal tray 62 may move vertically upward to supply another payload guide 50 for removal from the upper end of the payload guide magazine 28. The effectors or payload guides may be continuously supplied for the launching assembly 20a.

The payload guide magazine 28 may be in communication with the control system 20b such that the payload guide magazine 28 may send and receive data from the control system 20b. As schematically shown in FIG. 3, the payload guide magazine 28 may include at least one sensor 64. The sensor 64 may be used to determine a number of effectors 48, 52, 54 or payload guides 44, 50 remaining in the payload guide magazine 28. The sensor 64 may send data regarding the effectors 48, 52, 54 or the payload guides 44, 50 to a processor and a controller 66 of the control system 20b. The processor will be described below, as part of the control system 20b. The controller 66 may be in communication with the horizontal tray 62 for moving the horizontal tray 62 in response to the sensor 64 sensing that a payload guide 44 has been removed from the payload guide magazine 28. The effectors 48, 52, 54 may also be charged in the payload guide magazine 28 via electrically mating connectors provided in the electro-mechanical case 46. The electrical connectors may be in communication between a power source of the control system 20b and the effectors 48, 52, 54 such that power may be transferred through the payload guide magazine 28 to the effectors 48, 52, 54. Any suitable power source may be used and an adaptor may be provided between the power source and the payload guide magazine 28.

After an effector or payload guide is dispensed for use by the payload guide magazine 28, a moveable robot arm may engage the effector or the payload guide 44. The robot 26 may include a main body 70 that is mounted on the moving platform 24. Any suitable robot having at least one robot arm may be used and in an exemplary configuration, the robot 26 may include a plurality of robot arms that are each capable of launching an effector. A plurality of robots that each have a single moveable robot arm may also be used. The main body 70 may include a base that is fixed to the moving platform 24, or the weight of the main body 70 may be sufficient to maintain the main body 70 in a fixed and non-moveable position on the moving platform 24. The robot 26 may be arranged within the housing 40.

The robot 26 may include a robot arm 72 that is moveably attached to the main body 70. The robot arm 72 may be a six-axis articulated robot arm having six degrees of freedom. The robot arm 72 may be rotatable and may be pivotable relative to the main body 70. The robot arm 72 may have at least one joint 74 or a plurality of joints. As shown in FIG.

2, the robot arm 72 may have a stowed position where the robot arm 72 is retracted and the robot 26 is in a compact configuration. As shown in FIGS. 4 and 5, the robot arm 72 may also have an operative position where the robot arm 72 is extended from the main body 70. The cover 42 of the housing 40 may be opened when the robot 26 is in the operative position. When in the operative position, the robot arm 72 may include a proximate portion 76 that is attached to the main body 70 at a proximate end 78 and a distal portion 80 that extends from a distal end 82 that is distally opposite the proximate end 78. In an exemplary position of the robot 26, the proximate portion 76 may extend vertically and the distal portion 80 may extend horizontally. The proximate portion 76 may be rotatable relative to the main body 70 and pivotable about a vertical axis. The distal portion 80 may be pivotable about a vertical axis and may include an end portion 84 that is vertically pivotable about an end of the distal portion 80.

The end portion 84 may be directly engageable with the effector for removing the effector from the payload guide magazine 28 and firing the effector when the end portion 84 of the robot arm 72 and the effector are engaged. In the exemplary configuration where the end portion 84 is directly engageable with the effector, a payload guide may be omitted. As shown in FIG. 4, a first type of effector 86 may be engageable with the end portion 84 of the robot arm 72. When the launching system is configured in a naval vessel application, the first type of effector 86 may be part of a rapid-fire, radar-controlled, radar-guided gun system for defeating anti-ship missiles and other close-in air and surface threats. When the launching system is configured in a land vehicle application, the first type of effector 86 may be part of a counter rocket, artillery or mortar system used to detect and destroy incoming rounds in the air before the rounds hit a ground target. The effector may be part of any system that is configured to search, detect, evaluate threats, track, and engage targets.

As shown in FIG. 5, the end portion 84 may be engageable with an adaptor 88 arranged on an electro-mechanical case 90 of the canister or payload guide 44. The end portion 84 may be rotatable about a horizontal axis of the distal portion 80 to engage the adaptor 88. The end portion 84 may be rotated to extend vertically downward and lowered via the distal portion 80 pivoting in a vertically downward direction. The end portion 84 may engage the payload guide 44 within the payload guide magazine 34 when the payload guide 44 is in a stored position. After engagement with the adaptor 88 of the payload guide 44, the adaptor 88 and the end portion 84 may be locked together for movement such that the distal portion 80 may be pivoted in a vertically upward direction to raise the payload guide 44 out of the payload guide magazine 34. The payload guide 44 may then be in an engaged position where the payload guide 44 is engaged with the end portion 84. The end portion 84 may then be rotated to extend vertically upward for firing the effector 48 from the payload guide 44.

Figure 6:
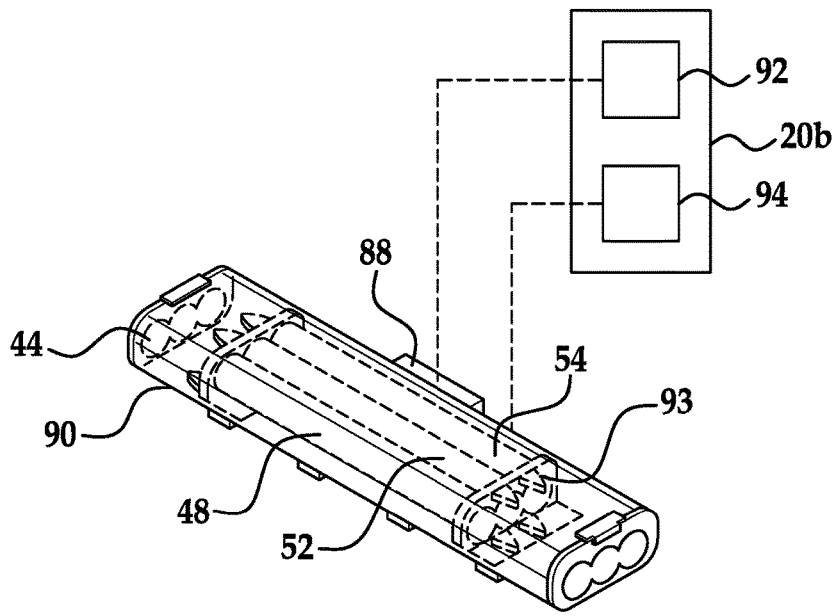
FIG. 6 is a schematic drawing showing a payload guide of the launching assembly.

Referring in addition to FIG. 6, the payload guide 44 may include an electro-mechanical interface, such as an electro-mechanical case 90. The adaptor 88 and the electro-mechanical case 90 of the payload guide 44 may be in communication with the control system 20b. The payload guide 44 may be configured to send and receive data from the control system 20b. The electro-mechanical case 90 may include at least one sensor 92 for sensing a number of effectors 48, 52, 54 in the payload guide 44. The control system 20b may include a converting module 94 that is in communication with the electro-mechanical case 90 for converting electronic messages and power from the control system 20b to a signal that is readable by the effectors 48, 52, 54 for executing a launching sequence. The electro-mechanical case 90 may also include at least one electrical connector 93 or a plurality of electrical connectors that mate with the effectors 48, 52, 54 to charge batteries of the effectors 48, 52, 54 when the effectors are being stored. The electrical connector 93 may be electrically connected to a power source for transferring power to the effectors. The electrical connector 93 may be connected to the power source via additional electrical connections in the payload guide magazine.

Figure 7:
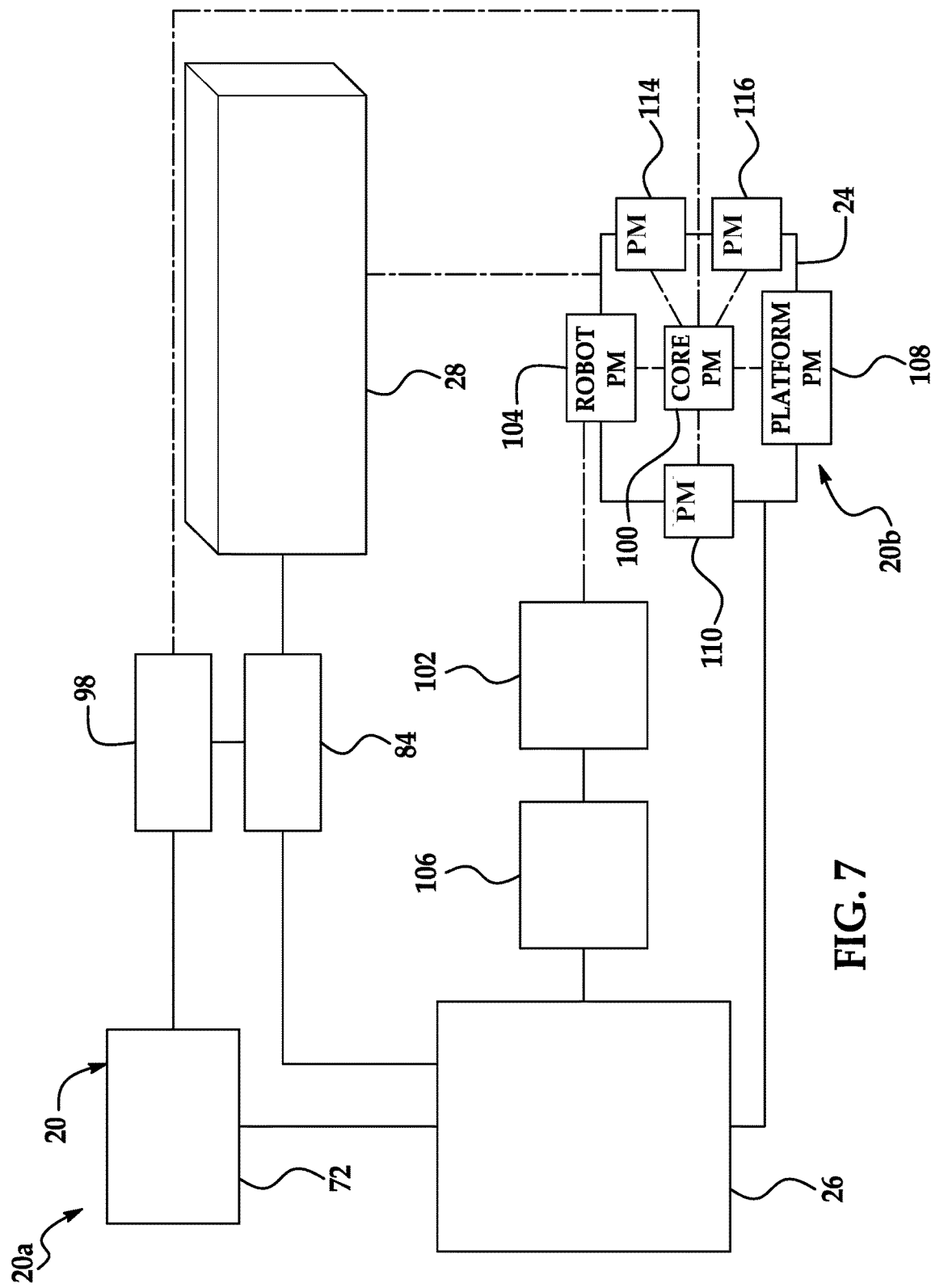
FIG. 7 is a schematic drawing showing a robot of the launching assembly and the modular control system.

Referring in addition to FIG. 7, the effector launching system may include at least one sensor 98 for detecting movement of the moving platform 24. After the robot arm 72 has engaged the payload guide 44, the moving platform 24 and the robot 26 arranged on the moving platform 24 may have relative movement. During normal travel of the vehicle, the moving platform 24 may move with the vehicle. The sensor 98 may be associated with the end portion 84 of the robot arm 72. Any suitable sensor may be used to detect movement of the moving platform 24. The sensor 98 may be configured to determine data pertaining to acceleration, vibration, tilt, orientation in space, angular velocity, pitch, or rotation of the robot 26 based on the movement of the moving platform 24. The sensor 98 may be embedded in the end portion 84 of the robot arm 72.

In an exemplary configuration of the sensor 98, the sensor 98 may include a gyroscopic sensor. The gyroscopic sensor may be configured to measure the angular velocity and orientation of the robot 26. The gyroscopic sensor may be configured to measure the angular velocity in degrees or revolutions per second. An accelerometer sensor may also be used for measuring the acceleration and tilt. As shown in FIG. 7, the gyroscope sensor may be in communication with a core processor module 100 of the control system 20b. The gyroscope sensor may be configured to send data pertaining to the angular velocity to the core processor module 100 and the core processor module 100 may be configured to calculate and provide an output pertaining to a real time position of the moving platform 24 and the robot 26 arranged on the moving platform 24. The real time position may be calculated as a location along a pitch axis, a roll axis, or a yaw axis, or as an amount of rotation of the robot 26 about an X, Y, and Z axis (i.e. pitch, roll, and yaw, respectively).

In another exemplary configuration of the sensor 98, the sensor 98 may include an inertial measurement unit (IMU) located at the end portion 84 of the robot arm 72. The IMU may use a combination of angular or linear accelerometer sensors for detecting a change in position and gyroscopic sensors for establishing an angular reference point. The IMU may also include a magnetometer sensor to detect a drift in orientation of the moving platform 24. The IMU may be configured to detect a real time rate of acceleration and a change in pitch, roll, or yaw and the IMU may include a sensor for each of the pitch, roll, and yaw axes. The IMU may be configured to send the measured data to the core processor module 100 and the core processor module 100 may be configured to calculate and provide an output pertaining to a real time position of the moving platform 24 and the robot 26 arranged on the moving platform 24. The IMU may also be in communication with a global position system to determine the position of the moving platform 24.

In response to the detected position of the moving platform 24 by the sensor 98, a motion stabilization controller 102 may be configured to move the robot arm 72 to stabilize the end portion 84. A gyroscopic sensor and an IMU sensor are examples of sensors that may be used, but any suitable type of sensor or a combination of different types of proprioceptive sensors may be used to detect movement of the moving platform 24 and the robot 26. Examples of proprioceptive sensors include IMUs, global positioning systems, inclinometers, magnetometers, gyroscopes, and accelerometers.

The control system 20b may also include a robot power module 104 for converting data from the core processor module 100 into readable data for the motion stabilization controller 102. The motion stabilization controller 102 may be configured to move the robot arm 72 via a motorized driver 106. The motorized driver 106 may move the robot arm 72 in at least one of six degrees of freedom, such that the motion stabilization controller 102 may be used to stabilize the end portion 84 and maintain the end portion 84 in a globally static position. The end portion 84 may be stabilized after the end portion 84 has selected and engaged a payload guide from the payload guide magazine 28 and before firing the chosen effector from the payload guide 44. The sensor 98, the core processor module 100, and the motion stabilization controller 102 may form a feedback control system for maintaining the end portion 84 in the globally static position.

In addition to the robot power module 104, the control system 20b may include a plurality of power modules for executing a predetermined launching sequence of the launching system 20. The plurality of power modules may each be converting modules that are configured to transmit power and data between the core processor module 100 and any effectors that are to be used in the launching assembly 20a of the launching system 20. The core processor module 100 may include a memory for storing predetermined launching sequences pertaining to different missions that may be performed by the launching system 20. The converting modules may be in communication with the core processor module 100 to send and receive data pertaining to the different sequences. The core processor module 100 may also be in communication with the controller 66 for the horizontal tray 62, as shown in FIG. 3, and with the converting module 94 for the payload guide 44, as shown in FIG. 7, for sending and receiving data regarding the effectors. Using the plurality of converting modules enables the control system 20b and the launching system 20 to be modular and reconfigurable for launching different types of effectors.

For example, one of the converting modules may be a platform power module 108 used to transmit and receive data between the moveable platform 24 and the core processor module 100. The platform power module 108 may be configured to test the launching system 20 and provide an output pertaining to the efficiency of the launching system 20 prior to operation. For example, a testing sequence may include using the robot arm to engage the payload guide without firing the effector. The platform power module 108 may also be used to convert and transfer power from the moveable platform 24 to other components of the launching system 20, such as the different types of effectors for the launching assembly 20a.

Another one of the converting modules may be a ship self-defense system power module 110. The self-defense system power module 110 may be in communication with the self-defense system to detect, track, assess, control, and engage targets. The ship self-defense system power module 110 may be configured to convert data pertaining to the detected targets and send the data to the core processor module 100 for adjusting the type of effector or the number of effectors to be launched by the moving platform launching system 20a. Many other types of systems and corresponding converting modules may be used in the control system 20b for performing other functions of the launching system 20. Examples of suitable functions that may be performed by the effector launching system 20 include effector launching, global positioning detection, and radar detection.

Using the modular control system 20b and the launching assembly 20a, a vehicle may fire the effectors as part of a launching sequence for the vehicle. The vehicle may contain a plurality of multi-effector or missile launchers that use the robot 26 with the robot arm 72 to select different types of effectors for firing. In an exemplary configuration of the launching assembly 20a, a plurality of first effectors and a plurality of second effectors may be provided on the moving platform 24 of the vehicle. In a naval vessel application, the first effectors may be medium-range, surface-to-air missile that are used to counter anti-ship missiles and the second effectors may be lightweight, infrared homing surface-to-air missiles that are used to counter anti-ship cruise missiles. For example, a launching sequence may require 16 first effectors and 60 second effectors that are launchable via the robot 26. The core processor module 100 may be in communication with the first effectors and the second effectors via a first effector power module 114 and a second effector power module 116, respectively. The power modules 114, 116 may be used to send and receive data between the core processor module 100 and the effectors for executing the launching sequence. The effector launching system 20 may further include a plurality of third effectors in addition to the first and second effectors. For example, the effector launching system 20 may include six third effectors. Any suitable effector type may be used with the robot 26 and any combination of effector types may be used. Any number of effectors may also be suitable.

As shown in FIG. 5, the payload guide 44 may be configured to hold two second effectors 48 and the corresponding payload guide magazine 28 may be configured to hold five payload guides, such that the payload guide magazine 28 associated with the second effectors may contain ten second effectors. All of the numbers are just examples, and any number of effectors may be used. The robot arm 72 may be configured to move up to around 453 kilograms (around 1000 pounds). As also shown in FIG. 5, the robot arm 72 may also be configured to engage the first effectors. The payload guide magazine 32 may be configured to hold 3 first effector containers that each contain a single first effector. The payload guide magazines 28, 32, 34 may be configured to hold more or fewer containers or payload guides such that more or fewer effectors may be contained and used during various launching sequences.

Figure 8:
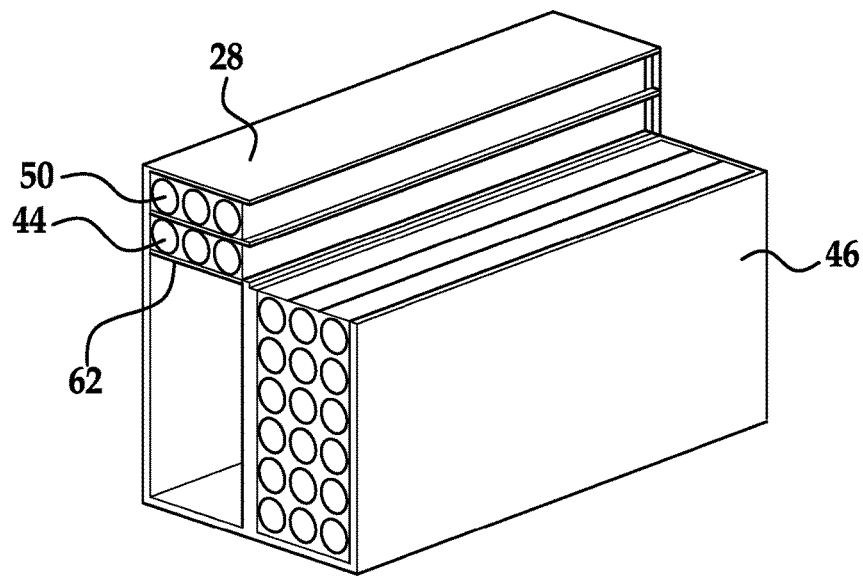
FIG. 8 is a schematic drawing showing an expended payload guide magazine of the launching assembly.

Referring now to FIG. 8, the robot arm may place the expended payload guide back in the payload guide magazine 28. The expended payload guide 44 may be disengaged from the robot arm and placed back in the payload guide magazine 28. The robot arm may be moveable to lower the expended payload guide 44 in the electro-mechanical case 46 of the payload guide magazine 28 or place the expended payload guide 44 in the upper end of the electro-mechanical case 46. The horizontal tray 62 may be lowered when another expended payload guide 50 is placed in the electro-mechanical case 46. As previously described, the electro-mechanical case 46 may be in communication with the control system 20b to send data pertaining to the number of expended payload guides 44, 50 contained within the electro-mechanical case 46 such that the control system can determine the number of effectors that have been expended.

Figure 9:
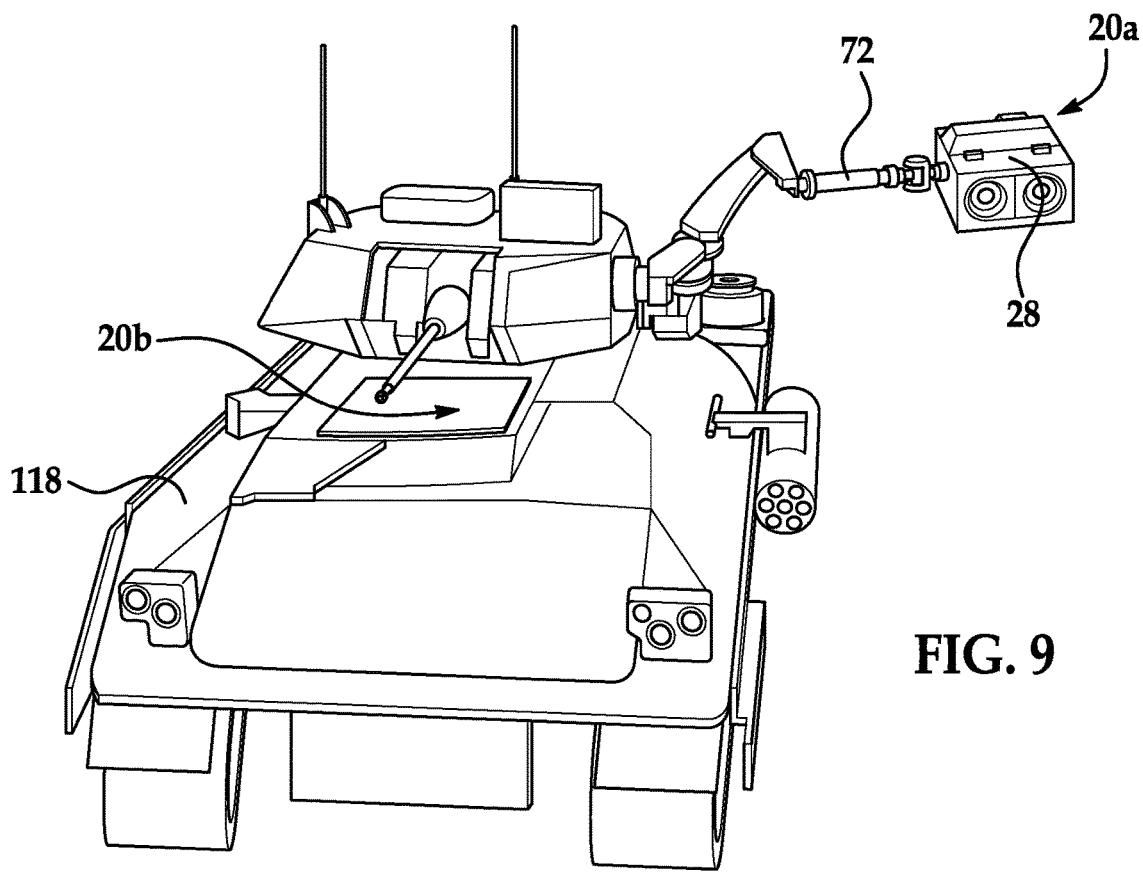
FIG. 9 is a schematic drawing of a land vehicle implementing the effector launching system.

Referring now to FIG. 9, an exemplary land vehicle 118 is schematically shown. The land vehicle 118 may be a main battle tank, infantry fighting vehicle, armored personnel carrier, mine-protected vehicle, light armored vehicle, self-propelled artillery, anti-aircraft, unmanned combat vehicle, or any suitable type of vehicle. The land vehicle 118 may include the launching assembly 20*a* and the control system 20*b* as previously described. As schematically shown, the launching assembly 20*a* may include the robot arm 72 mounted to the land vehicle 118 that is shown in a deployed position. The launching assembly 20*a* may also include the guide magazine 28 that is engageable with the robot arm 72 for launching at least one effector when the guide magazine 28 and the robot arm 72 are engaged.

Figure 10:
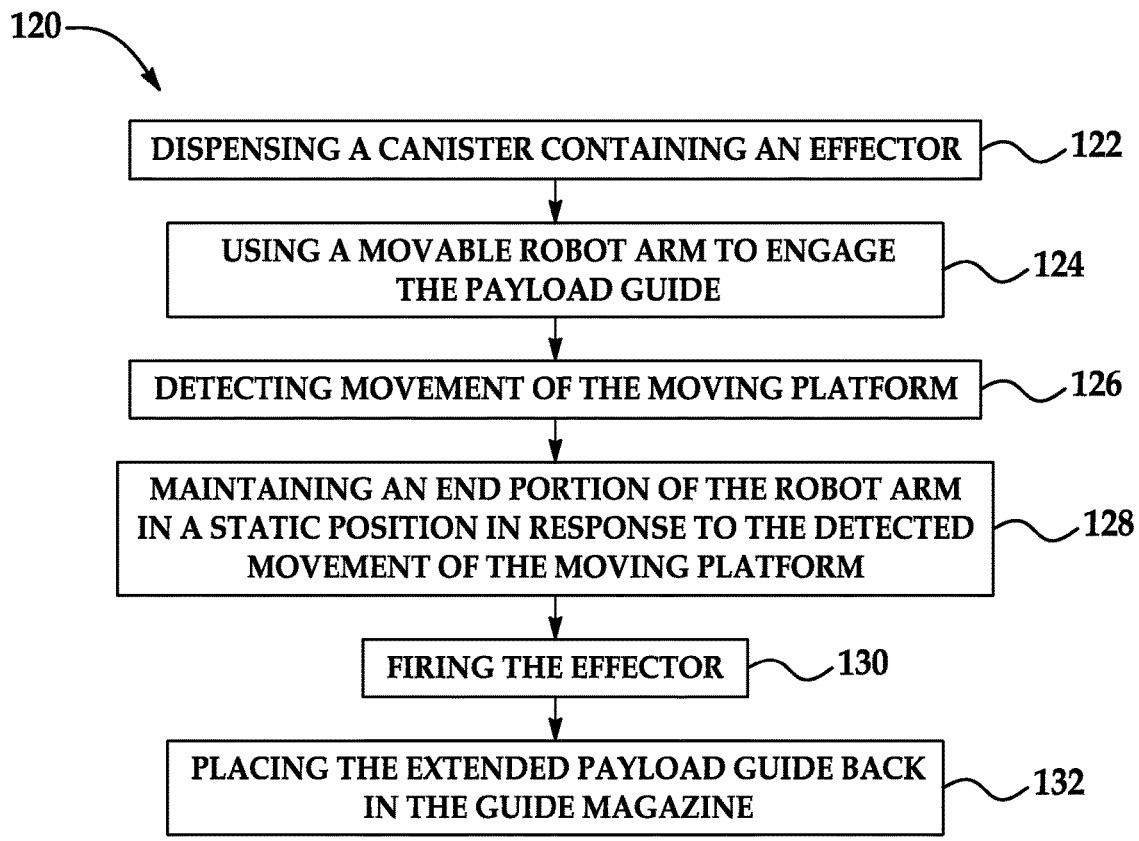
FIG. 10 is a flow chart showing a method for launching an effector using the effector launching system.

Referring now to FIG. 10, a method 120 for launching the effectors using the system described herein is schematically shown. Step 122 may include dispensing a canister, or payload guide, containing an effector. The payload guide magazine as previously described may be used to dispense the canister containing the effector. The canister may include a plurality of effectors and the payload guide magazine may include a plurality of canisters. After at least one canister has been dispensed, step 124 includes using a moveable robot arm to engage the effector or the payload guide. The moveable robot arm may remove the effector or the payload guide from the payload guide magazine. After the effector or the payload guide is engaged with the moveable robot arm, step 126 includes detecting movement of the moving platform, or ship deck. Sensors as previously described may be used to detect the movement of the platform. When the sensors have detected the movement of the moving platform and communicated the data to a processor, the processor may be in communication with a controller for controlling the robot arm, such that step 128 may be maintaining an end portion of the robot arm in a static position in response to the detected movement of the moving platform. While the end portion of the robot arm is maintained in the static position, at least one effector may be fired. After the effector is fired, step 132 may include using the robot arm to place the expended payload guide or effector housing back in the payload guide magazine.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An effector launching system that is located on a moving platform, the launching system comprising:
   a plurality of effectors;
   a robot that includes:
      a main body that is fixed to the moving platform, and
      a moveable robot arm having an end portion that is engageable with the plurality of effectors for firing the plurality of effectors;
   a sensor for detecting movement of the moving platform;
   a processor that is in communication with the sensor; and
   a motion stabilization controller that is in communication with the processor and the robot arm for controlling movement of the robot arm, wherein the motion stabilization controller adjusts the robot arm in response to the detected movement of the moving platform to maintain the end portion in a static position when the end portion is engaged with at least one of the plurality of effectors.

2. The effector launching system of claim 1 further comprising a payload guide that houses the plurality of effectors, wherein the payload guide has an engaged position and a storage position, the payload guide being engaged with the end portion of the robot arm when in the engaged position for firing the effector from the payload guide, the payload guide being disengaged from the end portion when in the storage position.

3. The effector launching system of claim 2, wherein the payload guide includes an electro-mechanical interface that provides for communication between the robot and the plurality of effectors housed in the payload guide.

4. The effector launching system of claim 2 further comprising a payload guide magazine that houses a plurality of payload guides, the payload guide magazine being configured to automatically dispense one of the plurality of payload guides when another one of the plurality of payload guides is expended.

5. The effector launching system of claim 4 further comprising a plurality of payload guide magazines, wherein each of the plurality of payload guide magazines houses a different type of effector or payload guide.

6. The effector launching system of claim 4, wherein the payload guide magazine includes an electro-mechanical interface that is in communication with the effectors for determining a number of effectors housed in the payload guide magazine.

7. The effector launching system of claim 1, wherein the sensor is embedded in the robot arm.

8. The effector launching system of claim 1, wherein the sensor includes a gyroscope.

9. The effector launching system of claim 1, wherein the sensor includes an inertial measurement unit.

10. The effector launching system of claim 1 further comprising a modular control system having a core processor module and a plurality of converting modules for executing a mission sequence, wherein one of the plurality of converting modules is connectable between the core processor module and the robot for converting data from the core processor module to readable data for the robot.

11. A method of launching an effector from a moving platform, the moving platform including a plurality of effectors and a robot having a main body fixed to the moving platform, the method comprising:
   using an end portion of a moveable robot arm to engage at least one of the plurality of effectors;
   detecting movement of the moving platform;
   adjusting the moveable robot arm to maintain the end portion of the moveable robot arm in a static position in response to the detected movement of the moving platform when the robot arm is engaged with the at least one of the plurality of effectors; and maintaining the end portion in the static position while firing the effector.

12. The method of claim 11 further comprising storing the plurality of effectors in a payload guide and engaging the end portion of the moveable robot arm with the payload guide to fire the effectors from the payload guide during engagement.

13. The method of claim 12 further comprising using a plurality of payload guides that each contain different types of effectors.

14. The method of claim 13 further comprising automatically supplying one of the plurality of payload guides for engagement with the moveable robot arm after another one of the plurality of payload guides is expended.

15. The method of claim 14 further comprising automatically dispensing the plurality of payload guides using a payload guide magazine that houses the plurality of payload guides.

16. The method of claim 15 further comprising using the payload guide magazine to determine a number of effectors or payload guides contained in the payload guide magazine.

17. The method of claim 11 further comprising using a sensor to detect movement of the moving platform.

18. The method of claim 17, wherein using the sensor includes using a gyroscope.

19. The method of claim 17, wherein using the sensor includes using an inertial measurement unit.

20. The method of claim 11, wherein adjusting the moveable robot arm includes using a controller to control movement of the moveable robot arm.

* * * * *